(12) United States Patent
Kwon

(10) Patent No.: US 7,962,795 B2
(45) Date of Patent: Jun. 14, 2011

(54) EMBEDDED SYSTEM AND METHOD OF RECOVERING FLASH MEMORY

(75) Inventor: Hae Young Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 271 days.

(21) Appl. No.: 12/218,839

(22) Filed: Jul. 18, 2008

(65) Prior Publication Data

US 2009/0158086 A1 Jun. 18, 2009

(30) Foreign Application Priority Data

Dec. 13, 2007 (KR) .......................... 10-2007-0130540

(51) Int. Cl.
*G06F 11/00* (2006.01)
(52) U.S. Cl. ........................................................ 714/36
(58) Field of Classification Search ...................... 714/36
See application file for complete search history.

(56) References Cited

U.S. PATENT DOCUMENTS

| | | | |
|---|---|---|---|
| 5,793,943 A * | 8/1998 | Noll ................................. | 714/6 |
| 5,805,882 A * | 9/1998 | Cooper et al. ................... | 713/2 |
| 7,069,431 B2 * | 6/2006 | Dayan et al. ...................... | 713/2 |
| 7,100,087 B2 * | 8/2006 | Yang et al. ....................... | 714/36 |
| 7,185,191 B2 * | 2/2007 | Bosley et al. .................... | 713/2 |
| 7,188,278 B1 * | 3/2007 | Diaz et al. ....................... | 714/36 |
| 7,870,378 B2 * | 1/2011 | Kuo et al. ........................ | 713/2 |
| 2004/0114808 A1 * | 6/2004 | Rothman et al. ............... | 382/232 |
| 2005/0097542 A1 * | 5/2005 | Lee ................................. | 717/168 |
| 2006/0062046 A1 * | 3/2006 | Babudri et al. ............ | 365/185.09 |
| 2006/0218437 A1 * | 9/2006 | Kawa et al. ..................... | 714/6 |
| 2007/0022328 A1 * | 1/2007 | Tarra et al. ..................... | 714/100 |

FOREIGN PATENT DOCUMENTS

| | | |
|---|---|---|
| KR | 10-1999-0051945 | 7/1999 |
| KR | 10-2002-0049096 A | 6/2002 |

* cited by examiner

*Primary Examiner* — Gabriel L Chu
(74) *Attorney, Agent, or Firm* — Edwards Angell Palmer & Dodge LLP; Peter F. Corless

(57) ABSTRACT

The present invention provides an embedded system and method for recovering the file system of flash memory when damage has occurred to the file system of the flash memory. The embedded system is equipped with NOR flash memory. The embedded system includes boot Programmable Read-Only Memory (PROM) and a Central Processing Unit (CPU). The boot PROM stores a normal state check value for a Cyclic Redundancy Check (CRC), and performs the recovery of the NOR flash memory if it is determined that a failure has occurred in the NOR flash memory through failure detection. The CPU is set such that it jumps to the boot PROM at the time of startup of the embedded system.

3 Claims, 7 Drawing Sheets

(a) Value extracted from shell of flash memory in normal state (b) Value extracted from shell of flash memory in which data has been damaged

US 7,962,795 B2

EMBEDDED SYSTEM AND METHOD OF RECOVERING FLASH MEMORY

CROSS-REFERENCE TO RELATED APPLICATIONS

This application claims under 35 U.S.C. §119(a) priority to Korean Application No. 10-2007-0130540, filed on Dec. 13, 2007, the disclosure of which is incorporated herein by reference in its entirety.

BACKGROUND

1. Technical Field

The present invention relates generally to an embedded system, and, more particularly, to an apparatus and method for recovering the file system of flash memory in an embedded system when damage has occurred to the file system of the flash memory.

2. Background Art

Various electronic systems have been integrated in cars. Real-time control applications, such as an electronic trunk release, an electric mirror adjustment device, rain detection, a sun roof, a weather condition management device, power windows, a seat adjustment device, a power train, stability control (an Anti-lock Braking System (ABS), towing control, and an active suspension), engine management and transmission, and a multimedia devices, such as an Internet terminal and a digital Television (TV), are installed and used in cars.

Electronic systems, including multimedia devices, navigation devices and telematics devices, are kinds of embedded systems.

The invention described herein features embedded systems equipped with NOR flash memory, comprising boot Programmable Read-Only Memory (PROM) for storing a normal state check value for a Cyclic Redundancy Check (CRC) and a Central Processing Unit (CPU) set such that it jumps to the boot PROM at a time of startup of the embedded system. FIG. 1 is a block diagram of a conventional embedded system, and FIG. 2 is a flowchart showing operation of an embedded system to provide the reliability of NOR flash memory.

Referring to FIG. 1, in certain preferred embodiments, an embedded system 100 basically includes a Central Processing Unit (CPU) 110, Synchronous Dynamic Random Access Memory (SDRAM) 120, which is volatile memory, NOR flash memory 130 for storing applications, and storage 140 for storing a large amount of data (such as navigation map data and multimedia files). In preferred embodiments, the storage 140 may be, but is not limited to, a Universal Serial Bus (USB), a Compact Flash (CF) card or a Hard Disk Drive (HDD).

Referring to FIG. 2, after the embedded system 100 starts at step S200, whether a failure has occurred in the NOR flash memory 130 is determined at step S210. Since the NOR flash memory 130 is not indefinitely reliable, there is a possibility of the occurrence of an abnormality of power, damage to a file system attributable to Electromagnetic Interference (EMI), or physical/logical failure attributable to an erroneous application.

If it is determined that there is no failure when the determination of whether a failure has occurred is made, the embedded system 100 operates normally at step S220. However, if there is a failure, the entire embedded system 100 stops and cannot operate any further at step S230.

In certain cases, an embedded system requiring high performance (a multimedia device, a navigation device, a telematics device or the like) is equipped with an Operating System (OS), flash memory for storing applications, USB memory for storing a large amount of data, and high-capacity storage, such as a CF card or a HDD. This means that the embedded system, requiring high performance, has a higher possibility of failing than a microcomputer-based system.

Meanwhile, there is no method of preventing the stoppage of the entire embedded system in an abnormal operational state (for example, in the case in which a logical failure, such as abnormal power, damage to a file system due to EMI, or damage to a file system due to an erroneous application, has occurred).

The above information disclosed in this the Background section is only for enhancement of understanding of the background of the invention and therefore it may contain information that does not form the prior art that is already known in this country to a person of ordinary skill in the art.

SUMMARY OF DISCLOSURE

The present invention provides an embedded system and a method of recovering flash memory, in which the embedded system recovers by itself from a failure in an abnormal operational state, thus realizing high availability. In one aspect, the invention features an embedded system equipped with NOR flash memory, comprising boot Programmable Read-Only Memory (PROM) for storing a normal state check value for a Cyclic Redundancy Check (CRC) and a Central Processing Unit (CPU) set such that it jumps to the boot PROM at a time of startup of the embedded system.

Another object of the present invention is to provide an embedded system and a method of recovering flash memory, in which boot PROM is added, so that a failure in the system can be overcome by overwriting the initial state image of the file system of the flash memory, previously stored in relatively high capacity and stable external memory, in the flash memory.

In one embodiment, the present invention provides an embedded system equipped with NOR flash memory, including boot Programmable Read-Only Memory (PROM) for storing a normal state check value for a Cyclic Redundancy Check (CRC), and performing recovery of the NOR flash memory if it is determined that a failure has occurred in the NOR flash memory through failure detection; and a Central Processing Unit (CPU) set such that it jumps to the boot PROM at the time of startup of the embedded system.

In preferred embodiments, the embedded system may further include storage for storing a normal state recovery image for flash memory in a compressed form, wherein the boot PROM may perform the recovery of the NOR flash memory by overwriting the recovery image for flash memory, stored in the storage, in the NOR flash memory if it is determined that a failure has occurred in the NOR flash memory. The embedded system may further include Synchronous Dynamic Random Access Memory (SDRAM), wherein the boot PROM may decompress the recovery image for flash memory stored in the storage, store it in the SDRAM and then overwrite the decompressed recovery image for flash memory in the NOR flash memory if it is determined that a failure has occurred in the NOR flash memory.

In certain embodiments, the boot PROM may perform the failure detection by calculating the current check value of the file system of the NOR flash memory and comparing the current check value with the previously stored normal state check value.

The present invention provides a method of recovering from a failure when the failure occurs in NOR flash memory in an embedded system equipped with the NOR flash memory, including (a) jumping to boot PROM at a time of supplying power; (b) the boot PROM calculating a current check value of a file system of the NOR flash memory; (c) determining whether a failure has occurred in the NOR flash memory by comparing a previously stored normal state check value with the calculated check value; and (d) if, as a result of the determination, it is determined that a failure has occurred, copying a recovery image for flash memory, stored in storage in a compressed form, to the NOR flash memory.

In certain embodiments, the (d) copying may include (d-1) determining whether there is a recorded recovery completion flag in the storage; (d-2) if there is no recovery completion flag, copying the recovery image for flash memory, stored in the storage in a compressed form, to the NOR flash memory; and (d-3) recording the recovery completion flag in the storage.

In certain embodiments, the (d-2) copying may include decompressing the recovery image for flash memory, stored in the storage in a compressed form, in SDRAM; and copying the decompressed recovery image for flash memory to the NOR flash memory.

In certain preferred embodiments, the method may further include, after the (d-2) copying, rebooting the embedded system; calculating the current check value of the file system of the NOR flash memory in the boot PROM; determining whether a failure has occurred in the NOR flash memory by comparing the calculated check value with a previously stored normal state check value; if, as a result of the determination, it is determined that a failure has occurred, the method may further include in certain embodiments determining that physical damage has occurred and switching to a safe mode; and outputting a failure message on a display screen.

The invention includes a motor vehicle comprising an embedded system as described herein.

Embedded systems may include, e.g. multimedia devices, navigation devices, telematc devices, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
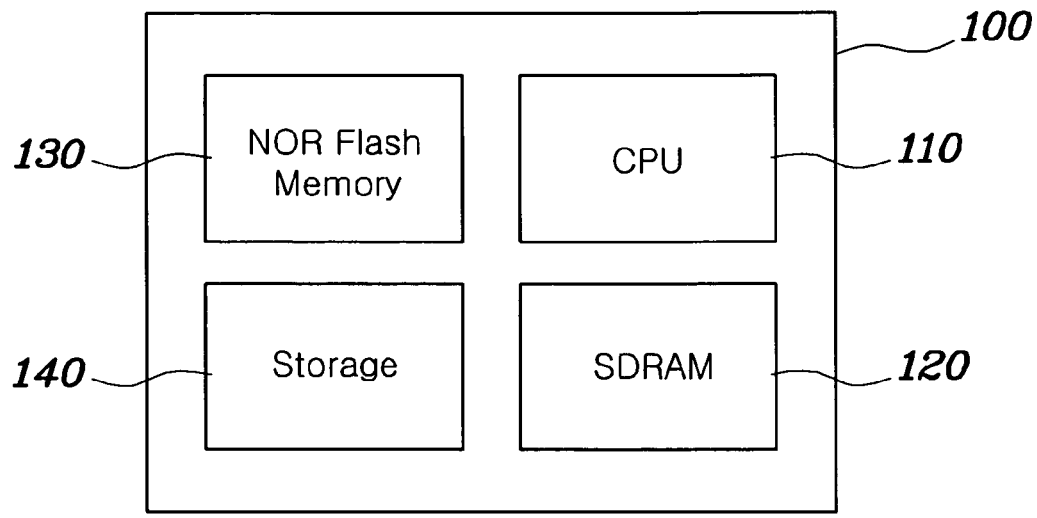
FIG. 1 is a block diagram of a conventional embedded system.
Figure 2:
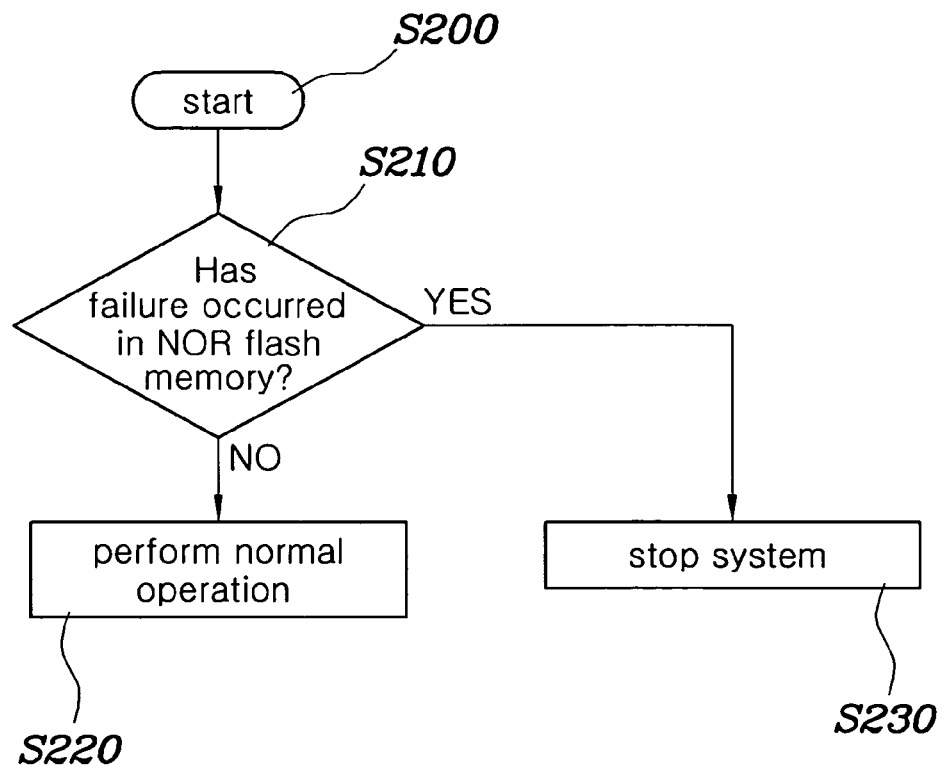
FIG. 2 is a flowchart of a prior art method of operating an embedded system to provide the reliability of NOR flash memory.

The invention described herein features an embedded system equipped with NOR flash memory, comprising boot Programmable Read-Only Memory (PROM) for storing a normal state check value for a Cyclic Redundancy Check (CRC) and a Central Processing Unit (CPU) set such that it jumps to the boot PROM at a time of startup of the embedded system.

In one embodiment, the embedded system further comprises performing recovery of the NOR flash memory if it is determined that a failure has occurred in the NOR flash memory through failure detection.

In other preferred embodiments, the embedded system further comprises storage for storing a normal state recovery image for flash memory in a compressed form, wherein the boot PROM performs recovery of the NOR flash memory by overwriting the recovery image for flash memory, stored in the storage, in the NOR flash memory if it is determined that a failure has occurred in the NOR flash memory.

The embedded system may further comprise, in exemplary embodiments, Synchronous Dynamic Random Access Memory (SDRAM), wherein the boot PROM decompresses the recovery image for flash memory stored in the storage, stores it in the SDRAM and then overwrites the decompressed recovery image for flash memory in the NOR flash memory if it is determined that a failure has occurred in the NOR flash memory.

In other exemplary embodiments of the invention described herein, the boot PROM performs the failure detection by calculating a current check value of a file system of the NOR flash memory and comparing the current check value with the previously stored normal state check value.

Also encompassed by the invention is a motor vehicle comprising the embedded system as described herein.

Reference now should be made to the drawings, in which the same reference numerals are used throughout the different drawings to designate the same or similar components.

Embodiments of the present invention will be described in detail below with reference to the accompanying drawings.

Figure 3:
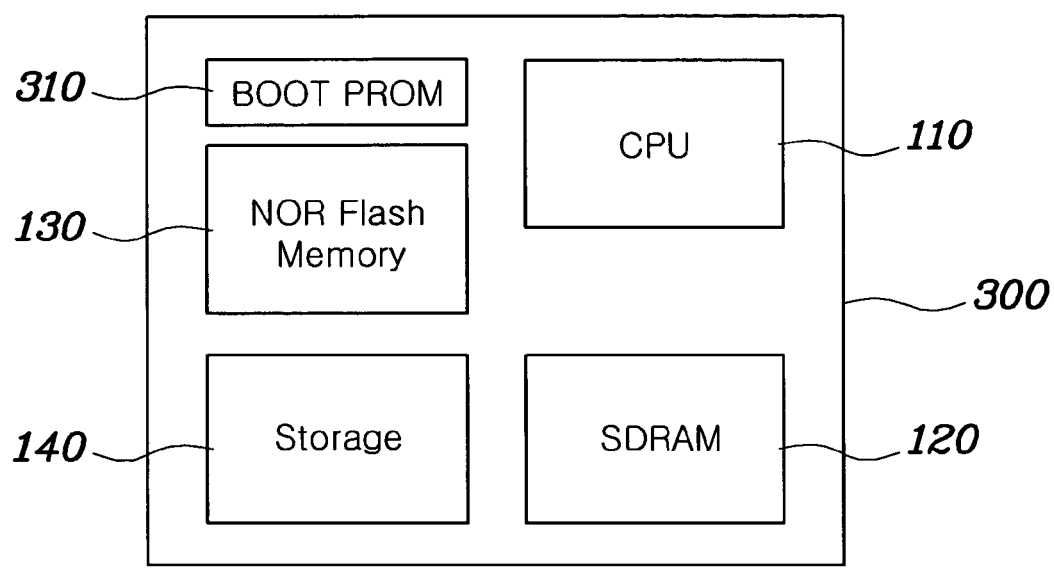
FIG. 3 is a block diagram of an embedded system according to an embodiment of the present invention.
Figure 4:
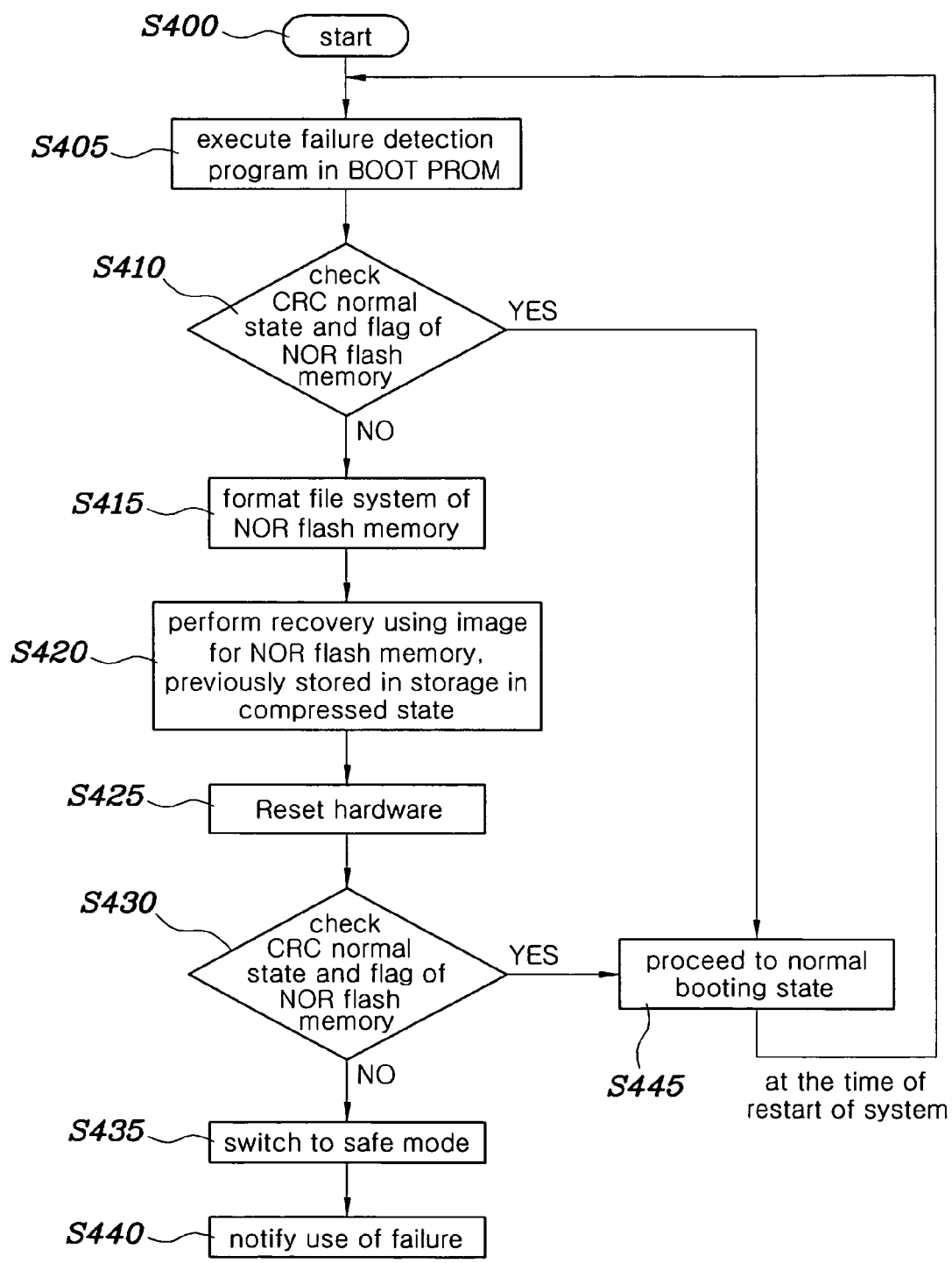
FIG. 4 is a flowchart of a method of recovering the flash memory of an embedded system according to an embodiment of the present invention.
Figure 5:
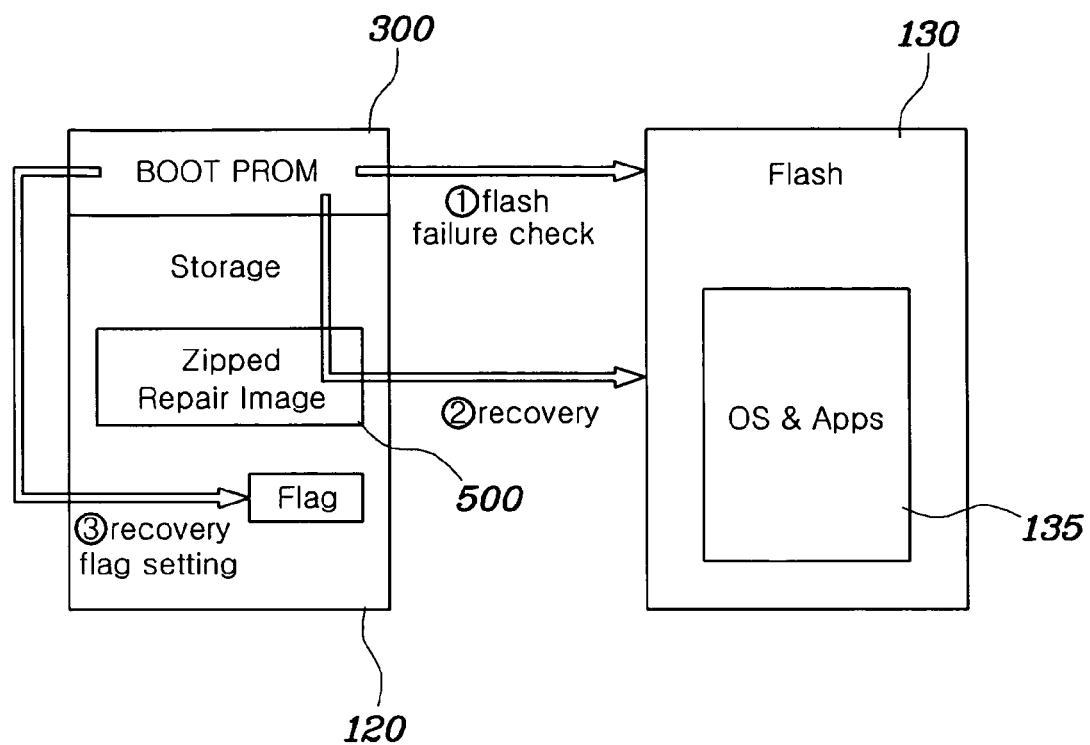
FIG. 5 is a diagram of the sequence of the operation of an embedded system according to an embodiment of the present invention.
Figure 6:
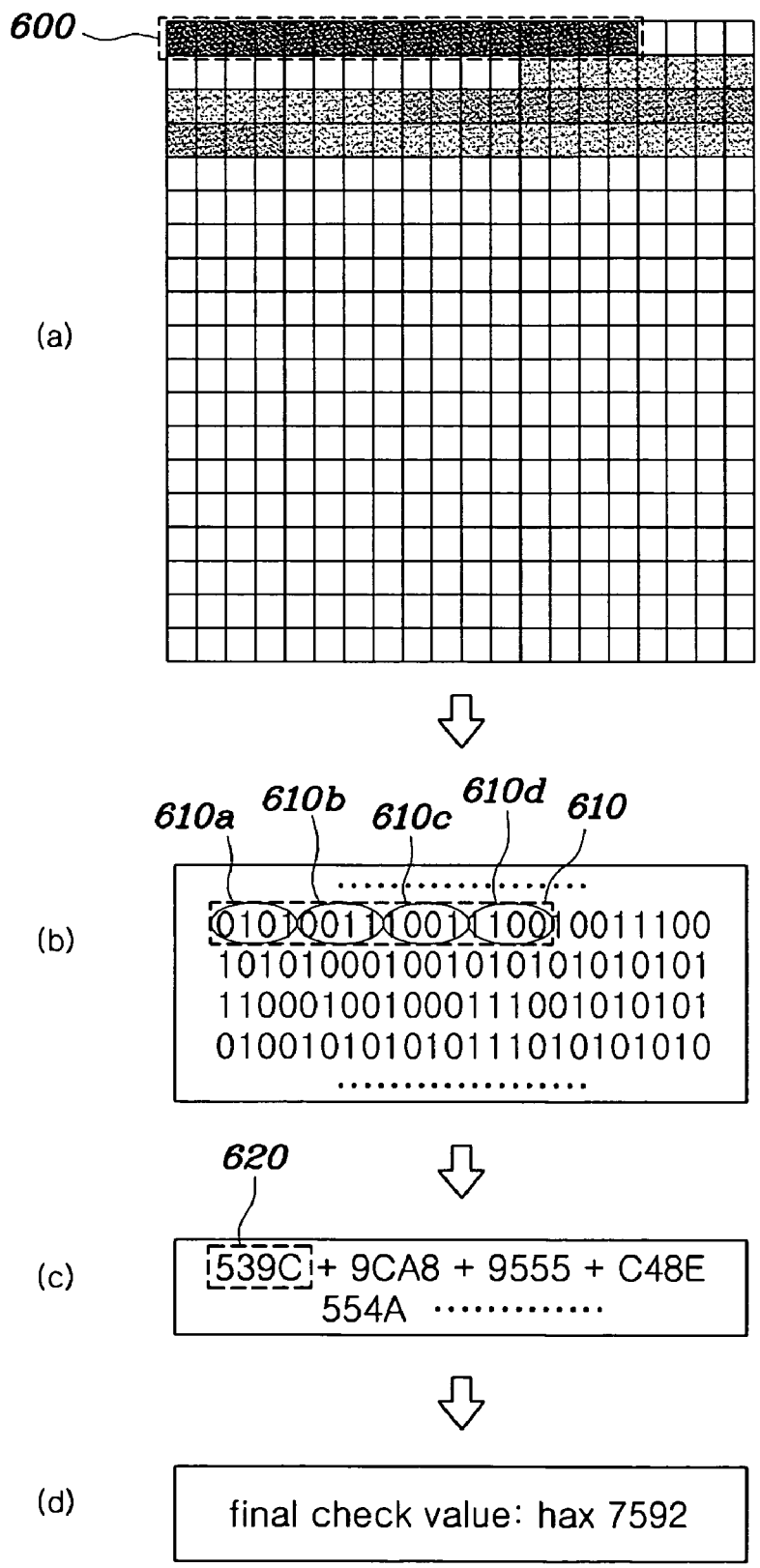
FIG. 6 is a diagram of a method of calculating a check value for a Cyclic Redundancy Check (CRC).
Figure 7:
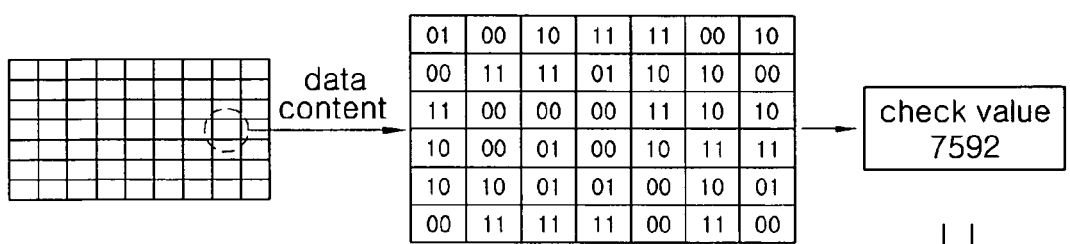
FIG. 7 is a diagram showing the check value of flash memory in a normal state and the check value of flash memory in an abnormal state.
Figure 7:
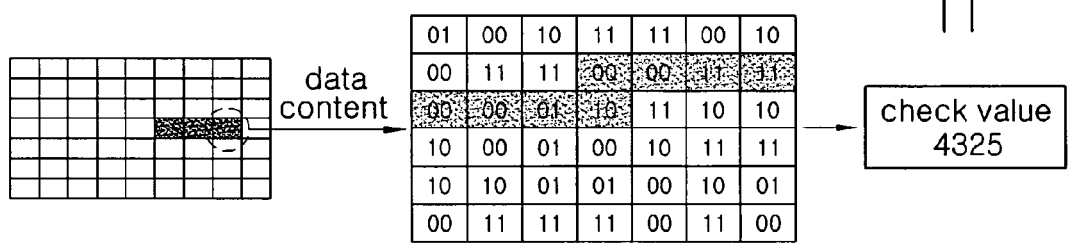
Figure 8:
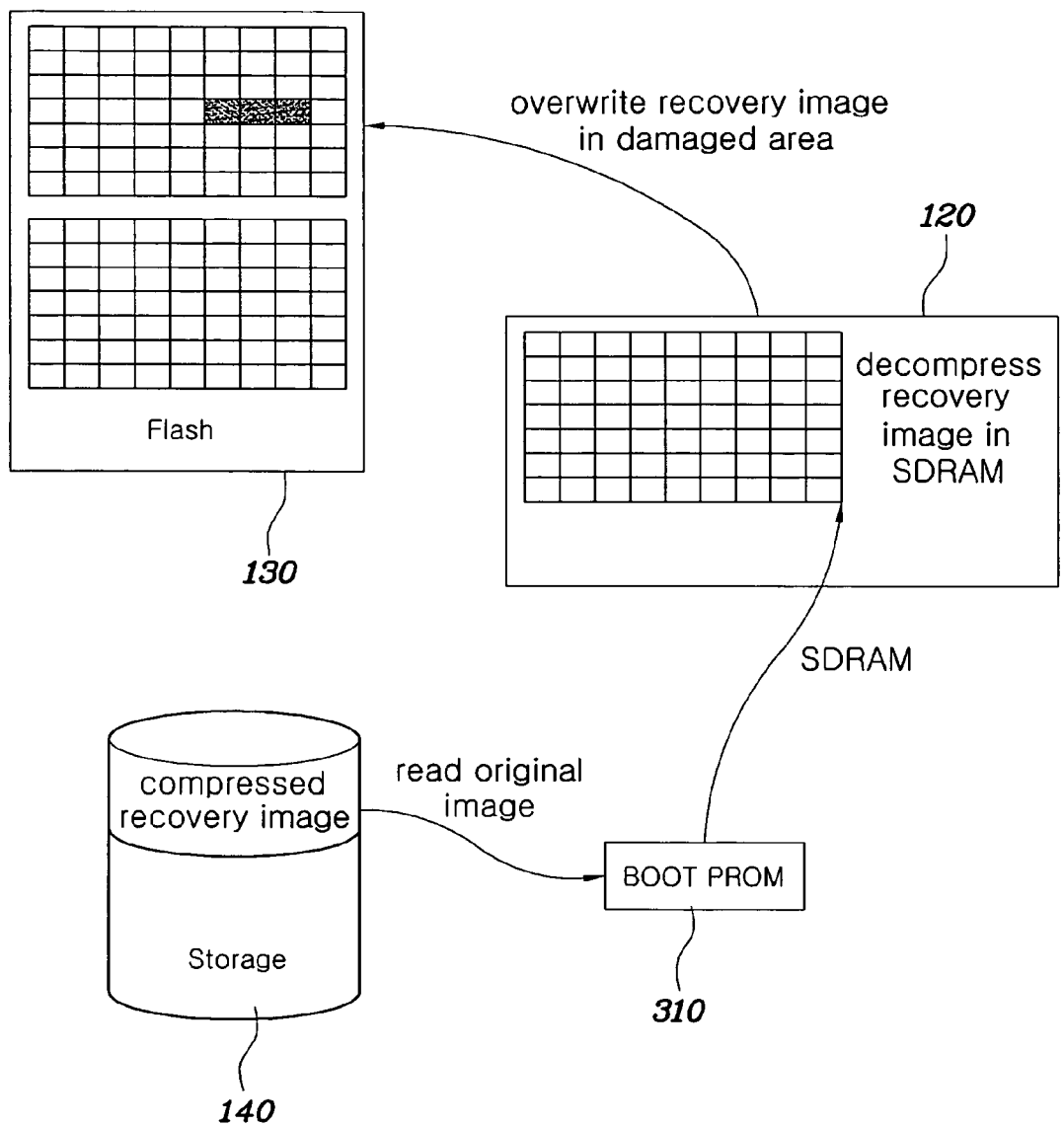
FIG. 8 is a diagram of a method of overwriting a recovery image in flash memory.

FIG. 3 is a block diagram of an embedded system according to an embodiment of the present invention. FIG. 4 is a flowchart of a method of recovering the flash memory of an embedded system according to an embodiment of the present invention. FIG. 5 is a diagram of the sequence of the operation of an embedded system according to an embodiment of the present invention. FIG. 6 is a diagram of a method of calculating a check value for a Cyclic Redundancy Check (CRC). FIG. 7 is a diagram showing the check value of flash memory in a normal state and the check value of flash memory in an abnormal state. FIG. 8 is a diagram of a method of overwriting a recovery image in flash memory.

Accordingly, such preferred embedded systems 300 of the invention include a CPU 110, SDRAM 120, which is volatile memory, NOR flash memory 130 for storing applications, storage 140 for storing a large amount of data (navigation map data, multimedia data or the like), and boot Programmable Read-Only Memory (PROM) 310.

The CPU 110 is set such that it jumps to the boot PROM 310 at the time of startup. The storage 140 stores a recovery image for NOR flash memory in a compressed form, which corresponds to NOR flash memory in a normal state.

The boot PROM 310 is programmable read-only memory, and stores a check value for a CRC when the NOR flash memory 130 is in a normal state, a failure detection program, and a program for the recovery of flash memory.

When the power of the embedded system 300 is turned on, a booting operation starts at step S400. The CPU 110 jumps to the boot PROM 310 and executes the failure detection program stored in the boot PROM 310 at step S405 (see ① in FIG. 5).

When the failure detection program is executed, the boot PROM 310 determines whether a failure has occurred in a file system by examining the check value for the CRC of the file system of the NOR flash memory 130 at step S410. In exemplary embodiments, the determination of whether a failure has occurred will be described with reference to FIGS. 6 and 7 below.

Accordingly, in certain preferred embodiments, first, the method of calculating a check value is as follows.

Referring to FIG. 6(a), one of a plurality of shells, constituting NOR flash memory, is illustrated. Of the plurality of shells, a first region 600 includes 16 units.

A binary number representation of the first region 600 is designated by reference numeral 610 of FIG. 6(b). The bit sum of the binary number within the first region 600 is converted into a hexadecimal number. The first region 600 is represented using the binary number '0101001110011100' (see 610). The first region 600 is divided into 0101 (=5) 610a, 0011 (=3) 610b, 1001 (=9) 610c, and 1100 (=C) 610d. The value, obtained by dividing the binary number of the reference numeral 610 into four-digit groups and converting the resulting values into a 4-digit hexadecimal value, is '539C' (see 620).

A final check value is obtained by adding the obtained four-digit hexadecimal values 620 (see FIG. 6(c)) and dividing the resulting value by a predetermined unit number (see FIG. 6(d)).

Assuming that a check value extracted from the shell of NOR flash memory 130 in a normal state is 7592 (see FIG. 7(a)), a check value (for example, 4325) different from 7592 is extracted from the shell of the NOR flash memory 130, in which data has been damaged, because the data of the shell has been changed (see FIG. 7(b)).

Accordingly, the normal state check value of the NOR flash memory 130 in a normal state is first calculated and then stored in the boot PROM 310. When the failure detection program is executed at step S410, the boot PROM 310 calculates the current check value of the NOR flash memory 130 as shown in FIG. 6, and can determine whether a failure has occurred by comparing the current check value with the previously stored normal state check value.

If it is determined that a failure has not occurred, the process proceeds to a normal booting state at S445.

If it is determined that a failure has occurred, whether there is a recovery completion flag value recorded in external memory, that is, the storage 140, at step S410. If there is no record, the NOR flash memory 130 is suitably formatted at step S415. Then, a recovery operation is performed using a recovery image for NOR flash memory, which was previously compressed and stored in the storage 140 at step S420 (see ② in FIG. 5).

Referring to FIG. 8, the boot PROM 310 reads the recovery image for flash memory from the storage 140. Then, the recovery image for flash memory is decompressed in the SDRAM 120, which is volatile memory. The flash memory 130 is suitably recovered by overwriting the recovery image for flash memory, decompressed in the SDRAM 120, in the damaged flash memory 130. Thereafter, in preferred embodiments, a recovery completion flag is stored in external memory, that is, the storage 140 (see ③ in FIG. 5).

In exemplary embodiments, hardware is reset at step S425, and the state of the file system of the NOR flash memory 130 is checked again in the boot PROM 310 through a CRC by rebooting the system at step S430. If no failure has occurred, normal booting is performed at step S445, and a recovery completion flag stored in the external memory is eliminated.

If a failure has occurred and a recovery completion flag is found in the external memory, it can be suitably determined that formatting and image recovery has been attempted. For example, it can be determined that the failure in question is not a logical failure, which can be overcome through formatting and image recovery, but a physical failure, which is caused by physical damage. Accordingly, in exemplary embodiments, an operational mode is switched to a safe mode at step S435, and a message, notifying a user of the failure, is shown on the display screen at step S440.

In certain exemplary embodiments, the above-described flash memory recovery method may be implemented as a computer program. Codes and code segments, constituting such a program, can be easily devised by computer programmers in the relevant field. Furthermore, the program is stored in computer readable media and is read and executed using a computer, thereby realizing a document search service provision method. The computer readable media include a magnetic storage medium, an optical storage medium, and a carrier wave medium.

In accordance with the embedded system and the flash memory recovery method according to the present invention, the embedded system recovers by itself from a failure even when in an abnormal operational state, thus realizing high availability.

According to preferred embodiments as described herein, the prevent invention has an advantage in that the PROM is added, so that a failure in the system can be suitably overcome by overwriting the initial state image of the file system of the flash memory, previously stored in relatively high-capacity and stable external memory, in the flash memory.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of recovering from a failure when the failure occurs in NOR flash memory in an embedded system equipped with the NOR flash memory, comprising:
   (a) jumping to boot PROM at a time of supplying power;
   (b) the boot PROM calculating a current check value of a file system of the NOR flash memory;
   (c) determining whether a failure has occurred in the NOR flash memory by comparing a previously stored normal state check value with the calculated check value; and
   (d) if, as a result of the determination, it is determined that a failure has occurred, copying a recovery image for flash memory, stored in storage in a compressed form, to the NOR flash memory, wheirerein the (d) copying comprises:
(d-1) determining whether there is a recorded recovery completion flag in the storage;
(d-2) if there is no recovery completion flag, copying the recovery image for flash memory, stored in the storage in a compressed form, to the NOR flash memory; and
(d-3) recording the recovery completion flag in the storage.

2. The method as set forth in claim 1, wherein the (d-2) copying comprises:
decompressing the recovery image for flash memory, stored in the storage in a compressed form, in SDRAM; and
copying the decompressed recovery image for flash memory to the NOR flash memory.

3. The method as set forth in claim 1, further comprising, after the (d-2) copying:
rebooting the embedded system;
calculating the current check value of the file system of the NOR flash memory in the boot PROM;
determining whether a failure has occurred in the NOR flash memory by comparing the calculated check value with a previously stored normal state check value;
if, as a result of the determination, it is determined that a failure has occurred, determining that physical damage has occurred and switching to a safe mode; and
outputting a failure message on a display screen.

* * * * *